Dec. 6, 1932.    J. Q. GAUBERT    1,889,781
VARIABLE CONDENSER DRIVE FOR RADIO APPARATUS
Filed Feb. 15, 1932    2 Sheets-Sheet 1
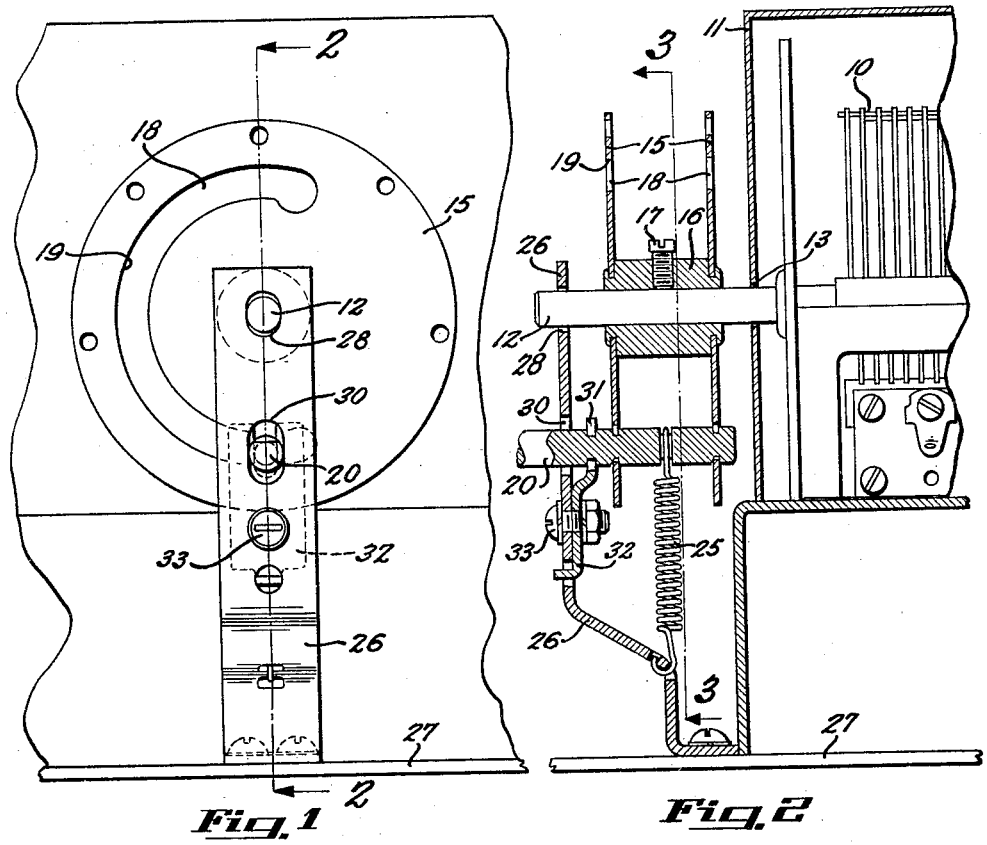
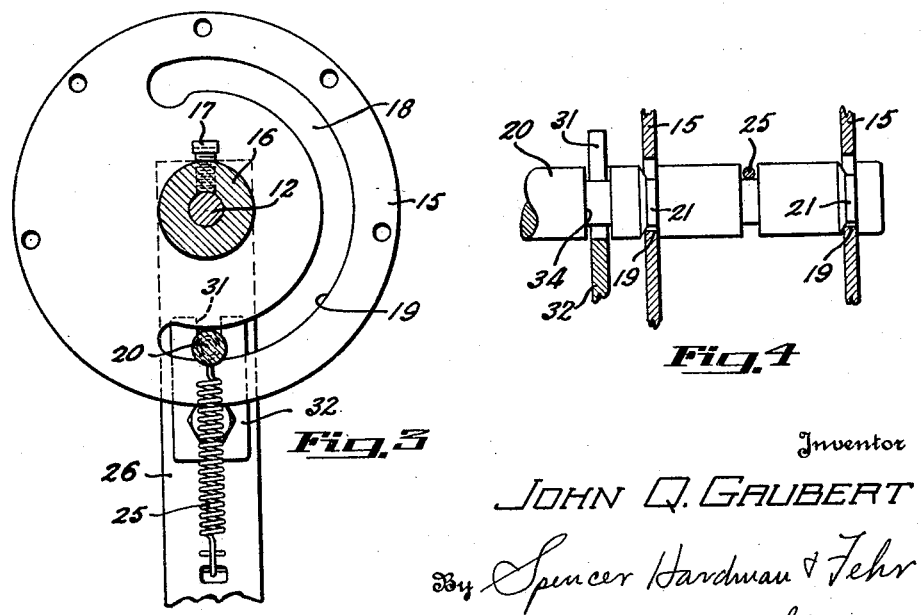
Inventor
JOHN Q. GAUBERT
By Spencer Hardman & Fehr
his Attorneys Dec. 6, 1932.  J. Q. GAUBERT  1,889,781
VARIABLE CONDENSER DRIVE FOR RADIO APPARATUS
Filed Feb. 15, 1932  2 Sheets-Sheet 2

Inventor
JOHN Q. GAUBERT
By Spencer Hardman & Fehr
his Attorneys

Patented Dec. 6, 1932

1,889,781

UNITED STATES PATENT OFFICE.

JOHN Q. GAUBERT, OF DAYTON, OHIO, ASSIGNOR TO GENERAL MOTORS RADIO CORPORATION, OF DAYTON, OHIO, A CORPORATION OF OHIO

VARIABLE CONDENSER DRIVE FOR RADIO APPARATUS

Application filed February 15, 1932. Serial No. 593,180.

This invention relates to a control device for actuating the shaft of a variable condenser or the like, particularly such as are used in radio apparatus.

An object of the invention is to provide a very simple yet efficient manual drive for such a variable condenser which occupies a minimum of space adjacent the condenser and hence greatly facilitates a practical compact arrangement of the various units in a radio receiving set or the like.

Another object is to provide such a manual drive having a manual drive shaft which does not require being mounted in a precisely aligned bearing or bearings and hence the cost of manufacture and assembling is minimized.

Another feature of the invention is the use of simple and economically made parts, such as sheet metal stampings for the driven friction disks and the bracket support for the simple driving shaft with grooves cut therein whereby it obtains proper friction engagement with the driven disks.

Further objects and advantages of the present invention will be apparent from the following description, reference being had to the accompanying drawings, wherein a preferred embodiment of one form of the present invention is clearly shown.

In the drawings:

Fig. 1 is an end view of the control device according to this invention, as seen looking to the right at Fig. 2.

Fig. 2 is a vertical section on line 2—2 of Fig. 1.

Fig. 3 is a vertical section on line 3—3 of Fig. 2.

Fig. 4 is a detail view showing the mounting of the manual driving shaft and its friction engagement with the friction disks which it drives.

Fig. 5 is an end view looking to the right at Fig. 6 and shows part of the dial scale broken away.

Fig. 6 is a vertical section on line 6—6 of Fig. 5.

Fig. 7 is a vertical section on line 7—7 of Fig. 6.

Fig. 8 is a detail view showing the mounting of the manual driving shaft on an enlarged scale.

Similar reference characters refer to similar parts throughout the several views.

Figure 5:
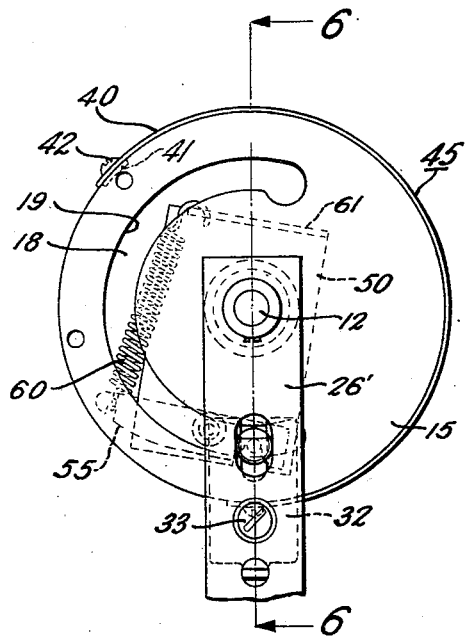
Figs. 5 to 8 show a modification.

10 designates the variable condenser unit suitably mounted within the shield housing 11 and having its rotatable shaft 12, by which its movable plates are rotated, projecting through the aperture 13 in the housing 11, as clearly shown in Fig. 2. This shaft 12 has two flat metal disks 15 fixed thereto in parallel relation. Disks 15 are preferably first rigidly mounted upon a hub 16 as shown and this hub then fixed to shaft 12 in properly adjusted position by set screw 17. Disks 15 have parallel arcute slots 18 concentric with shaft 12 cut therein extending through the desired arc, usually slightly more than 190 degrees.

The manually actuated driving shaft 20 has two friction grooves 21 cut therein and spaced apart the distance between disks 15, so that when shaft 20 is inserted in place in the slots 18 the outer edges 19 of slots 18 will ride in grooves 21 on shaft 20 (see Fig. 4). Grooves 21 are preferably beveled on one side and straight on the opposite side as clearly shown in Fig. 4 so that the friction between these parts is increased by a wedging action when shaft 20 is urged against the slot edges 19 by the tension spring 25. The lower end of spring 25 is supported upon a stationary bracket 26 suitably mounted on the base 27. It will now be seen that when the manually actuated shaft 20 is rotated by a suitable hand knob or button (not shown) shaft 20 will roll by friction engagement upon the slot edges 19. Now in order to retain shaft 20 against lateral movement, shaft 20 extends through the vertically elongated slot 30 in bracket 26 and slot 31 in the branch bracket 32 held rigidly fixed to bracket 26 by the clamping screw 33. These slots 30 and 31 engage the sides of shaft 20 and so aid in holding it in alignment and prevent its lateral movement. Hence when shaft 20 is rotated by hand its friction engagement with the disks 15 causes these disks to rotate rather than shaft 20 to roll laterally around in the arcuate slots 18. The upper portion of bracket 26 has a vertically elongated slot 28 therein which aids in guiding shaft 12 and supports it against lateral bending.

It will now be clear that shaft 20 may be easily assembled in place after bracket 26 is fixed in place but before the branch bracket 32 is attached thereto by simply passing shaft 20 through slot 30 and through the two arcuate slots 18. The spring 25 is then hooked over shaft 20 as clearly shown in Fig. 2 and then branch bracket 32 is slipped upwardly in position so that its slot 31 engages the groove 34 in shaft 20 and then screw 33 is clamped tight. No aligning bearing is required for shaft 20 since its pressure engagement with the two parallel disks 15 properly aligns it. The slots 30 and 31 permit the spring 25 to pull down shaft 20 into pressure engagement with the slot edges 19 on disks 15.

Figure 6:
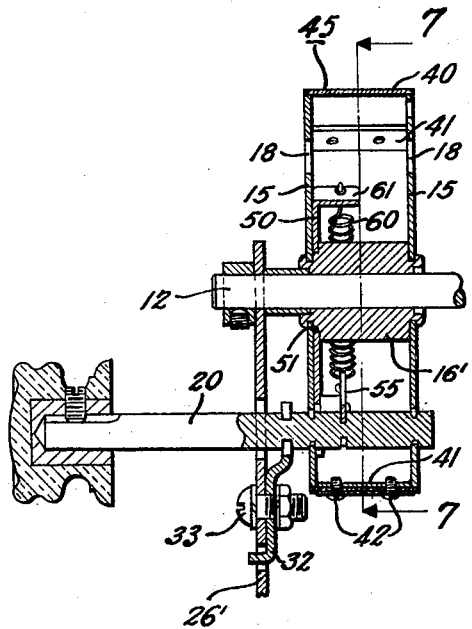
Figure 7:
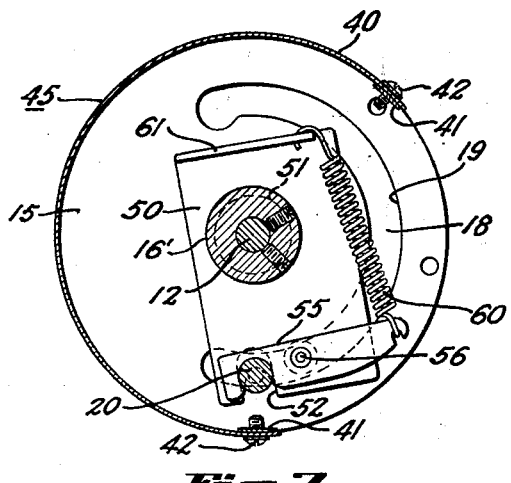
Figure 8:
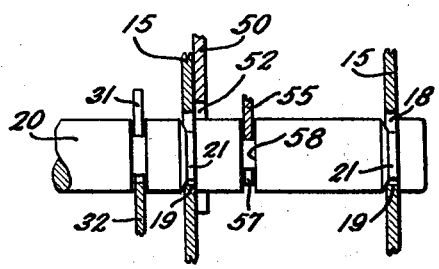

The form shown in Figs. 5 to 8 will now be described. In this form of the invention the two disks 15 have a dial scale 40 mounted upon their outer periphery by the suitable metal cross bars 41 and screws 42 which thus forms a drum 45. Since a spring arrangement such as shown in the form above described cannot be used, due to interference with the dial scale 40, in this form the entire spring mechanism is located within the drum 40. For this purpose a stationary bracket 50 is mounted within drum 45 by being rotatably mounted within groove 51 at one end of the rotating hub 16'. Bracket 50 is kept from rotating when hub 16' and drum 45 rotate by having a slot 52 in its lower portion which engages the manually actuated drive shaft 20 (see Fig. 6). It is thus seen that bracket 50 and parts attached thereto will not rotate even though it is mounted within and supported by the rotating drum 45. The drum shaft 20 is yieldably pressed against the outer edges 19 of arcuate slots 18 in disks 15 by means of a spring and lever arrangement. Lever 55 is pivotally mounted at 56 upon bracket 50 and has a slot 57 at one end thereof engaging within groove 58 on shaft 20. The other end of lever 55 is pulled upwardly by tension spring 60 whose upper end is hooked over a lug 61 projecting from bracket 50. Thus the lever 55 serves to yieldably press shaft 20 against the outer edges 19 of arcuate slots 18 and so provide the desired frictional engagement between drive shaft 20 and the driven disks 15.

In this form of the invention shaft 20 may be assembled in place substantially in the manner above described for the form of Figs. 1 to 4. In both forms the two spaced disks 15 maintain shaft 20 in proper relative alignment thereto and the brackets 26 and 32 engage shaft 20 in such a way as to permit vertical or slight endwise movements thereof so that the grooves 21 in shaft 20 can always track exactly upon the edges 19 of slots 18. In other words no precise adjustment of the location of the drum 45 relative to the support bracket 26 or 26' is necessary due to the described self-adjusting movement permitted to shaft 20. This feature facilitates and lessens the cost of assembling the parts and prevents disarrangement and improper tracking of shaft 20 upon the edges 19 after a period of use.

While the form of embodiment of the present invention as herein disclosed, constitutes a preferred form, it is to be understood that other forms might be adopted, all coming within the scope of the claims which follow.

What is claimed is as follows:

1. In combination, a variable condenser having a rotatable shaft, two spaced driving disks fixed to said shaft, said disks having aligned arcuate slots therein concentric with said shaft, a driving shaft extending through said aligned slots and having two spaced peripheral grooves frictionally engaging edges of said slots.

2. In combination, a variable condenser having a rotatable shaft, two spaced driving disks fixed to said shaft, said disks having aligned arcuate slots therein concentric with said shaft, a driving shaft extending through said aligned slots and having two spaced peripheral grooves frictionally engaging edges of said slots, and resilient means for urging said driving shaft against said slot edges.

3. In combination, a variable condenser having a rotatable shaft, two spaced driving disks fixed to said shaft, said disks having aligned arcuate slots therein concentric with said shaft, a driving shaft for said disks extending through said two slots and frictionally engaging the edges thereof, and means engaging said shaft intermediate said two disks for yieldably pressing said driving shaft against said slot edges.

4. In combination, a variable condenser having a rotatable shaft, two spaced driving disks fixed to said shaft, said disks having aligned arcuate slots therein concentric with said shaft, a driving shaft for said disks extending through said two slots and frictionally engaging the slot edges, a bracket member slidably mounted upon said condenser shaft between said disks and retained against rotation by engaging said driving shaft, and yieldable means mounted upon said bracket for pressing said driving shaft against said slot edges.

5. In combination, a variable condenser having a rotatable shaft, two spaced driving disks fixed to said shaft, said disks having aligned arcuate slots therein concentric with said shaft, a driving shaft for said disks extending through said two slots and frictionally engaging the slot edges, a bracket member slidably mounted upon said condenser shaft between said disks and retained against rotation by a slot therein engaging said driving shaft, and means located between said disks for urging said driving shaft against said slot edges comprising: a spring-pressed lever pivoted upon said bracket and engaging said driving shaft between said disks.

6. A condenser tuning control comprising: a condenser shaft having two spaced disks fixed thereto, said disks having aligned arcuate slots therein concentric with said shaft, a driving shaft passing through said aligned slots and frictionally engaging the parallel edges of said slots, and means located entirely within the space between said disks for yieldably pressing said shaft against said slot edges whereby to obtain substantial friction between said parts.

In testimony whereof I hereto affix my signature.

JOHN Q. GAUBERT.